United States Patent Office 2,898,439
Patented Aug. 4, 1959

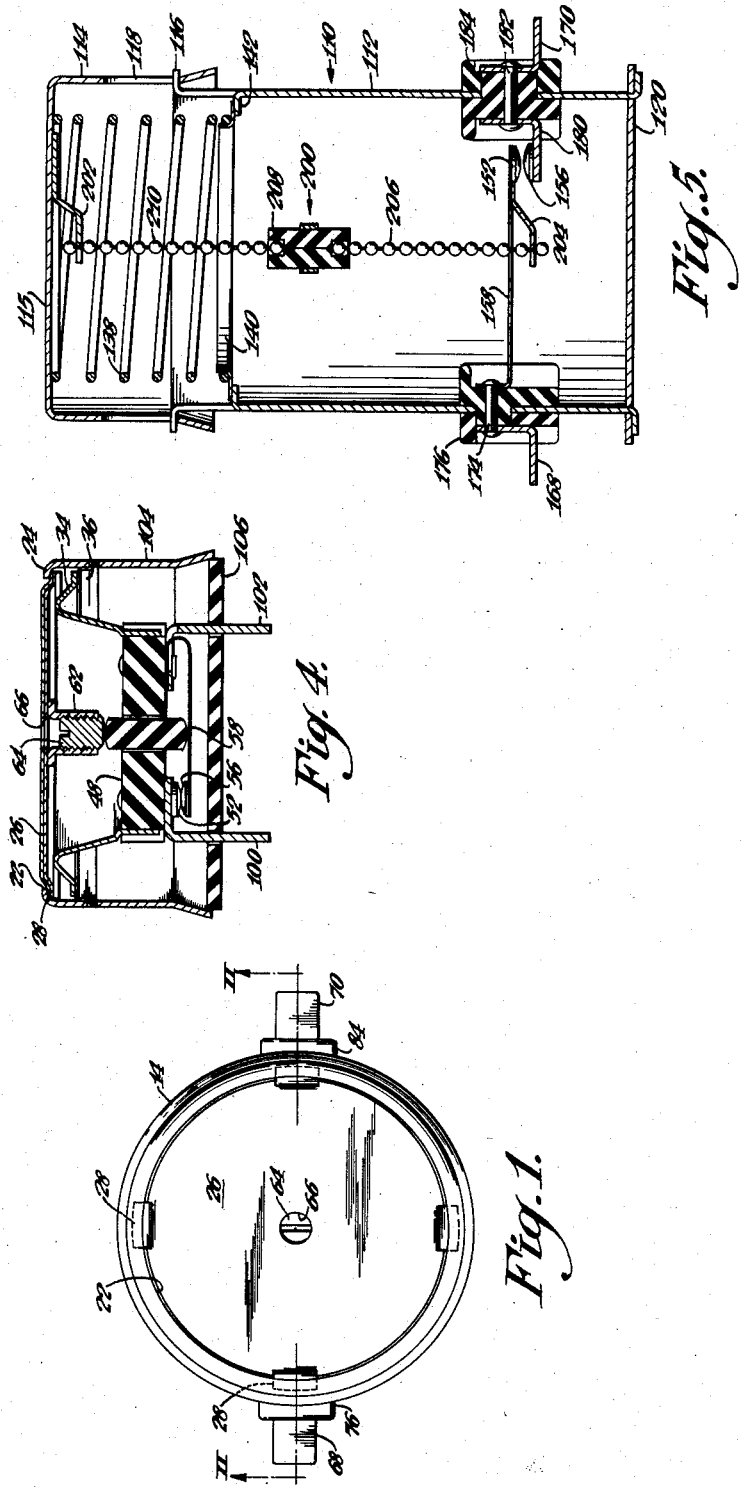

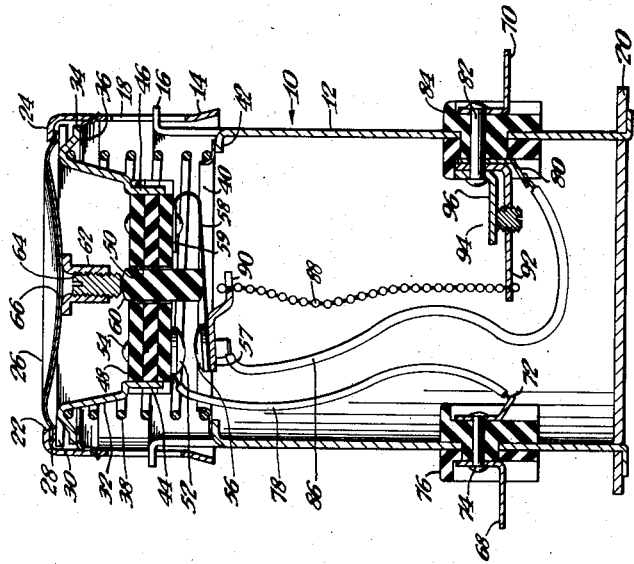
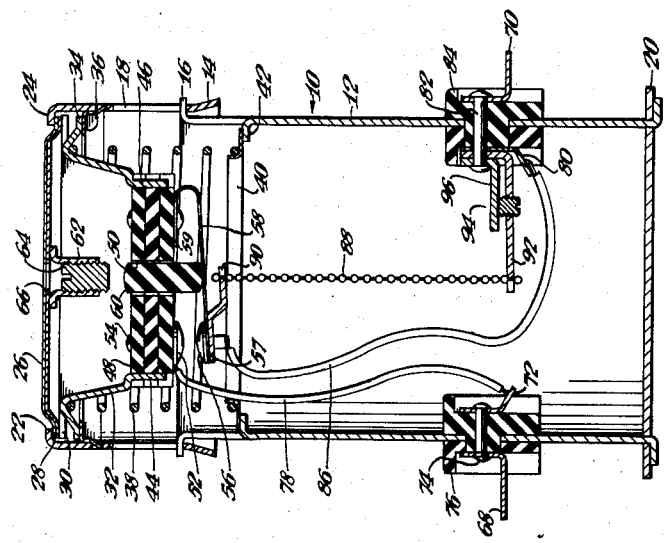

2,898,439

CONTROL DEVICE

Clarence Wantz, Greensburg, and Russell F. Garner, Youngwood, Pa., assignors to Robertshaw-Fulton Controls Company, Richmond, Va., a corporation of Delaware Application March 20, 1958, Serial No. 722,676

16 Claims. (Cl. 219—37)

This invention relates generally to thermostatic controls and more particularly to controls for surface heaters of cooking ranges and the like.

It has long been considered desirable to provide thermostatic control of the surface heating elements of cooking ranges in order to protect the contents of the cooking vessel placed thereon. Thermostatic controls of the above type are presented with many difficulties. Positioning the thermal element of these devices in the ambient temperature zone of the surface heater could not provide an accurate measure of the temperature of the food inside of the cooking vessel. Practical considerations forbid the placing of the thermal element within the cooking vessel or in contact with the food. Consequently, the contact of the thermal element with the cooking vessel must be on the exterior, easily made and broken, and within the zone of greatest heat of the surface heating elements. It is also necessary that the thermal element respond to the temperature of the cooking vessel and not to that prevailing at the source of heat.

It is a general object of this invention to avoid the foregoing difficulties in controlling the temperature of cooking vessels used upon the surface heaters of cooking ranges and the like.

Another object of this invention is to maintain the temperature of a cooking vessel placed upon the surface heating element of a cooking range at a fixed value.

Another object of this invention is to utilize, in a device of the above-indicated character, only one set of contacts to close the circuit to the heating element when a cooking vessel is placed on the heating element, to open the circuit when the cooking vessel attains a predetermined temperature, and to open the circuit when the cooking vessel is removed from the heating element.

Another object of this invention is to insure response of the device to the temperature condition of the cooking vessel to be controlled.

Another object of this invention is to construct a device of the above-indicated character durably and with a minimum number of parts which will render it economical to manufacture.

In a preferred embodiment of the invention, a pair of oppositely disposed contacts serially connected in the circuit to the surface heating element are mounted on a casing. One of the contacts is fixed and the other is movable into and out of engagement with the fixed contact. The casing is adapted to be positioned within the central opening of an annular surface heating element. The top of the casing includes a thermal element which is adapted to contact the cooking vessel to be controlled. An abutment means is operatively connected between the thermal element and the mounting for the movable contact. The thermal element is movable in response to temperature changes so that the abutment means is operable to open the contacts and break the circuit when the cooking vessel reaches a predetermined temperature. Hence, the cooking vessel is maintained at this predetermined temperature.

The above and other objects and features of the invention will appear more fully hereinafter from a consideration of the following description taken in connection with the accompanying drawings wherein:

Fig. 1 is a plan view of a preferred embodiment of the invention;

Fig. 2 is a cross-sectional view taken on line II—II of Fig. 1;

Fig. 3 is a cross-sectional view similar to Fig. 2 with parts shown in different operating positions;

Fig. 4 is a cross-sectional view of a modified embodiment; and

Fig. 5 is a cross-sectional view of another modified embodiment.

While the invention is described in connection with a surface heating element of a cooking range, it should be understood that the invention is not limited to such heating devices of the kind chosen for descriptive purposes herein but may find a wide field of usefulness wherever the control of temperatures is desired.

Referring more particularly to Figs. 1, 2, and 3, the thermostatic control illustrated therein includes a tubular telescopic casing 10 divided into a fixed section 12 and a movable section 14. The movable section 14 of the telescopic casing 10 is slidably mounted on one end of the fixed section 12 with the slidable movement thereof being limited by a plurality of lugs 16 formed on the fixed section 12 and extending through suitable slots 18 formed in the movable section 14. The other end of fixed section 12 is secured to a support plate 20 by suitable means. Support plate 20 is horizontally positioned beneath the annular surface heating element of the range to be controlled so that movable section 14 of telescopic casing 10 is within the central opening of the annular surface heating element.

The outermost end of movable section 14 has a circular opening 22 therein formed by the internal diameter of an inwardly projecting rim 24. A circular, bimetallic sensing disc 26 is mounted within circular opening 22 by means of a plurality of ears 28 which project downwardly and outwardly of the disc so as to contact the inner face of rim 24. The ears 28 are held tightly against rim 24 by means of a circular flange portion 30 at the top end of a generally circular support member 32. Projecting downwardly and outwardly from flange portion 30 are a plurality of ears 34 which engage a lock ring 36 secured to the movable section 14 by suitable means. Thus, support member 32 is mounted on lock ring 36 by means of ears 34. Disc 26 is mounted on flange portion 30 and secured within circular opening 22 by means of ears 28. Bimetallic disc 26 has its high expansion side facing toward the inside of telescopic casing 10 so that upon a rising temperature, the resulting dish will cause the disc 26 to move downwardly.

The telescopic casing 10 is normally biased toward its elongated position by compression spring 38 positioned between support member 32 and a support ring 40 mounted on inwardly projecting ears 42 on fixed section 12. Support plate 20 is so positioned with respect to the surface heater that when telescopic casing 10 is in its elongated position, as shown in Fig. 2, the top portion of movable section 14 extends slightly above the top surface of the heating element of the range to be controlled for a purpose which will appear more fully hereinafter.

Support member 32 also has a pair of tangs 44, 46 which project downwardly of support member 32 and axially of casing 10. A circular, Bakelite insulating disc 48, consisting of three sections, is secured horizontally within tangs 44, 46 in a suitable manner such as a press fitting. Disc 48 is thus centrally located within movable section 14 and contains a central bore 50 therein.

An electrical contact 52 is fixedly mounted on the bottom side of disc 48 by means of rivet 54. Another electrical contact 56 is rigidly mounted on a free end 57 of a flexible strip 58 for movement into and out of engagement with contact 52. Flexible strip 58 is riveted at its fixed end 59 to disc 48 and is so positioned that a movable portion thereof overlies central bore 50. Slidably mounted within central bore 50 is a Bakelite pin 60 which rests on the movable portion of flexible strip 58. Secured to the underside of bimetallic disc 26, as by welding, is an internally threaded eyelet 62. An adjusting screw 64 is threaded into eyelet 62 and may be rotated by the use of a central hole 66 in the bimetallic disc 26. Adjusting screw 64 is thus located axially of pin 60 and is engageable therewith for a purpose to be more fully described hereinafter.

A pair of terminal strips 68, 70 are mounted on the exterior of fixed section 12. Terminal strips 68, 70 are adapted to be serially connected in the circuit from the source of electrical energy to the heating element of an electric range or the like.

Terminal strip 68 is connected to an interior terminal strip 72 by means of a conductor pin 74. Terminal strips 68 and 72 and conductor pin 74 are all insulated from fixed section 12 by means of a Bakelite insulator member 76. Terminal strip 72 is electrically connected to contact 52 by means of an insulated conductor wire 78.

Terminal strip 70, which is mounted on fixed section 12 diametrically opposite to terminal strip 68, is connected to an interior terminal strip 80 by means of a conductor pin 82, all of which are insulatedly mounted on a Bakelite insulator member 84 which is secured to fixed section 12. Interior terminal strip 80 is electrically connected to contact 56 by means of an insulated conductor wire 86.

Means are provided for maintaining contact 56 out of engagement with contact 52 when the telescopic casing 10 is in its elongated position. Such means takes the form of a bead chain 88 connected at one end to an extending bar 90 which is rigidly secured to flexible strip 58 and at the other end to an extending strip 92 mounted on insulator member 84 by means of conductor pin 82. As best shown in Fig. 2, the length of chain 88 is such that when the telescopic casing 10 is in its elongated position, the chain will be moved to its taut position and hold contact 56 out of engagement with contact 52 by bending flexible strip 58 downwardly since the resiliency of the flexible strip 58 is much greater than the resiliency of extending strip 92. It will be apparent that the bias of spring 38 urging movable section 14 against lugs 16 is greater than the internal stress of flexible strip 58 biasing contacts 52 and 56 together.

The position in which chain 88 will hold contact 56 may be adjusted by means of an adjusting screw 94 threadedly mounted in extending strip 92 to abut a rigid strip 96 which overlies strip 92 and is mounted on insulating member 84 by conductor pin 82. Since rigid bar 96 has less resiliency than extending strip 92, rotation of adjusting screw 94 will cause bending movement of extending strip 92 and thereby adjust the position of flexible strip 58.

In the operation of the control shown in Figs. 1, 2, and 3, a cooking vessel placed on a surface heating element to which the control has been connected, will engage bimetallic disc 26 and move the movable section 14 downwardly against the bias of spring 38 from the position shown in Fig. 2 to the position shown in Fig. 3. With this arrangement, good contact of the cooking vessel and bimetallic disc is assured.

This movement will also allow contacts 52, 56 to come into engagement, thereby closing the circuit from the source of electrical energy to the heating element to energize the heating element. The cooking vessel which is supported on the surface of the heating element receives heat therefrom and experiences a rise in temperature which causes a corresponding temperature increase in the contents of the cooking vessel. When the temperature of the contents of the cooking vessel reaches that predetermined temperature at which it is desired to maintain these contents, the bimetallic disc 26 will have dished downwardly by an amount necessary to open contacts 52 and 56 and thereby de-energize the heating element. It will be apparent that as the bimetallic disc 26 dishes downwardly, adjusting screw 64 is moved downwardly to thereby engage pin 50, which is in axial alignment therewith, and move the same downwardly. Downward movement of pin 60 will cause a corresponding downward movement of flexible strip 58 to thereby move contact 56 out of engagement with contact 52.

As the contents of the cooking vessel cool below the desired temperature to be maintained, the bimetallic disc will return toward its flattened condition by an amount which will allow contact 56 to move into engagement with contact 52 under the bias of flexible strip 58. Thus, the heating element will again be energized. The control will cycle in the above manner to maintain the contents of the cooking vessel at the predetermined desired temperature. When the cooking vessel is removed, the telescopic casing 10 will return to the position shown in Fig. 2 and the circuit to the heating element will be broken by chain 88 as previously described.

Calibration of this control is extremely simple as it can be made before the movable section 14 is assembled to the fixed section 12. To calibrate, a suitable external electric circuit having a pilot light is connected in series with wires 78 and 86. The movable section 14 is then placed in a fixture so that the bimetallic disc 26 is in intimate contact with a temperature controlled plate having a hole therein so that a small screwdriver can make engagement with adjusting screw 64. Thus, at any predetermined temperature, if the adjusting screw is screwed inwardly to a point at which the pilot light just goes out, the control will be calibrated for this temperature. If it is desired to utilize the calibration screw 64 only for calibration at the plant, the threaded eyelet may be made of thin material so that it can be squeezed together so as to prevent movement after calibration is once made.

Referring now to Fig. 4, the thermostatic control illustrated therein is substantially the same in construction and operation as the embodiment illustrated in Figs. 1, 2, and 3, and like parts have been given like reference numerals. As this modification is adapted to be mounted on either the bottom or the side of a cooking vessel, the only essential difference over the control illustrated in Figs. 1, 2, and 3 is that the whole fixed assembly has been replaced by terminal strips 100 and 102, which are connected directly to contacts 52 and 56, respectively. A slightly different casing 104 is employed and an insulating disc 106 is used to enclose casing 104. Terminal strips 100 and 102 extend exteriorly of insulating disc 106 so that they may be connected into the circuit to the heating element for the cooking vessel to be controlled.

Referring now to Fig. 5, the control illustrated therein includes a telescopic cylindrical casing 110 divided into a tubular fixed section 112 and a cup-shaped movable section 114. The movable section 114 is slidably mounted on the upper end of fixed section 112 so that the base portion 115 of movable section 114 forms the top of the telescopic casing 110. The slidable movement of movable section 114 is limited by a plurality of lugs 116 formed on the upper end of fixed section 112 and extending through suitable slots 118 formed in movable section 114. The lower end of fixed section 112 is secured to a support plate 120 by suitable means. Support plate 120 may be positioned beneath an annular surface heating element of a hot plate or the like so that the movable section 114 of telescopic casing 110 is within the central opening of an annular surface heating element.

The telescopic casing 110 is normally biased toward its elongated position by compression spring 138 positioned between the inner side of base portion 115 of movable section 114 and a support ring 140 mounted on inwardly projecting ears 142 on fixed section 112. Support plate 120 is so positioned with respect to the heating element that when the telescopic casing 110 is in its elongated position, as shown in Fig. 5, the base portion 115 of movable section 114 extends slightly above the top surface of the heating element. A pair of terminal strips 168, 170 are mounted on the exterior of fixed section 112 at diametrically opposite points. Terminal strips 168, 170 may be serially connected in the heating element circuit.

Terminal strip 170 is connected to an interior terminal strip 180 by means of a conductor pin 182, all of which are insulatedly mounted on a Bakelite insulator member 184 which is secured to fixed section 112. Terminal strip 180 fixedly supports an electrical contact 156 in a horizontal position. Terminal strip 168 is connected to a flexible interior terminal strip 158 by means of a conductor pin 174, all of which are insulatedly mounted on a Bakelite insulator member 176 which is secured to fixed section 112. An electrical contact 152 is mounted on the free end of flexible strip 158 for movement into and out of engagement with contact 156. Flexible strip 158 is biased to urge contact 152 into engagement with contact 156.

Means are provided for maintaining contact 152 out of engagement with contact 156 when the telescopic casing 110 is in its elongated position. Such means takes the form of a chain member 200 connected at one end thereof to a hook 202 secured to the underside of top portion 115 of movable section 114, as by welding, and at the other end thereof to a hook 204 secured to the free end of flexible strip 158. Chain member 200 is divided into a bead chain 206 connected at one end to hook 204 and at the other end to an insulating joint 208 and a bead chain 210 connected at one end to hook 202 and at the other end to insulating joint 208. The length of chain member 200 is such that when the telescopic casing 110 is in its elongated position, chain member 200 is in its taut position and will hold contact 152 out of engagement with contact 156 by bending flexible strip 158 upwardly since the resiliency of hook 202 is much less than that of flexible strip 158. It will be apparent that the bias of spring 138 urging movable section 114 against lugs 116 is greater than the internal stress of flexible strip 158 biasing contacts 152 and 156 together. The position in which chain member 200 will hold contact 152 may be adjusted by bending hook 204 toward or away from flexible strip 158.

In the operation of control as illustrated in Fig. 5, a cooking vessel placed on a surface heating element to which this control has been connected will engage base portion 115 and move the movable section 114 downwardly. This movement will allow contacts 152 and 156 to come into engagement, thereby closing the heating element circuit. When the cooking vessel is removed from the heating element, the movable section 114 returns to the position shown in Fig. 5 to thereby move contact 152 out of engagement with contact 156 and break the circuit to the heating element.

It is to be understood that although several embodiments of this invention have been shown and described, the invention can further be variously embodied and other changes may be made in the construction and arrangement of parts without departing from the scope of the invention as defined by the appended claims.

We claim:

1. In a device for controlling the temperature of a cooking vessel supported on a surface heating element of a cooking range having a circuit connecting the heating element to a source of electrical energy, the combination comprising a pair of oppositely disposed contacts, means adapted for serially connecting said contacts in the circuit to the surface heating element, support means for said contacts adapted to be positioned in proximity to the cooking vessel to be controlled, means for fixedly mounting one of said contacts on said support means, means for mounting the other of said contacts on said support means for movement into and out of engagement with said fixed contact and being adapted to open and close the circuit to the surface heating element, and means for controlling said movement of said movable contact including thermally responsive means mounted on said support means and adapted for contact with the cooking vessel to be controlled and being movable in response to temperature changes of said cooking vessel, and abutment means operatively connected to said thermally responsive means and engageable with said means for mounting said movable contact, said abutment means being operatively adapted to open and close said pair of contacts at a predetermined temperature of said cooking vessel whereby said cooking vessel is maintained at said predetermined temperature, said thermally responsive means comprising a bimetallic disc element and said abutment means comprising means for adjusting the temperature at which said abutment means is operable to open said pair of contacts.

2. A device as claimed in claim 1 wherein said support means comprises a member composed of electrically insulating material and said pair of contacts is mounted on said member so that said pair of contacts are electrically insulated from each other when in the open position thereof.

3. In a device for controlling the temperature of a cooking vessel supported on a surface heating element of a cooking range having a circuit connecting the heating element to a source of electrical energy, the combination comprising a cylindrical casing adapted to be positioned in proximity with the cooking vessel to be controlled, a disc composed of electrically insulating material, support means secured to said casing for supporting said disc within said casing, a pair of oppositely disposed contacts, means for fixedly mounting one of said contacts on said disc, means for mounting the other of said contacts on said disc for movement into and out of engagement with said fixed contact, means for serially connecting said contacts in the circuit to the surface heating element, thermally responsive means mounted on said casing at one end thereof and adapted for contact with the cooking vessel to be controlled and being movable in response to temperature changes of the cooking vessel, and abutment means operatively connected to said thermally responsive means and engageable with said means for mounting said movable contact, said abutment means being operative to open said pair of contacts at a predetermined temperature of said cooking vessel whereby said cooking vessel is maintained at said predetermined temperature, said thermally responsive means comprising a bimetallic disc element and said abutment means comprising means for adjusting the temperature at which said abutment means is operable to open said pair of contacts.

4. A device as claimed in claim 3 wherein said disc includes an aperture therein and said abutment means comprises an adjustable member mounted on said thermally responsive means and movable therewith and a pin member slidable within said aperture and engageable at one end thereof with said adjustable member and at the other end thereof with said means for mounting said movable contact on said disc.

5. A device as claimed in claim 4 wherein said means for mounting said movable contact on said disc consists of a flexible strip having a portion thereof overlying said aperture, said flexible strip biasing said movable contact into engagement with said fixed contact.

6. A device as claimed in claim 5 wherein said adjustable member comprises a threadedly mounted plug and said pin member is composed of electrically insulating material.

7. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said cover section projects above the top of said surface heater when in said inoperative position, said top portion of said movable section being of substantially the same level as the top of said surface heater when said movable section is in said operative position, a pair of oppositely disposed contacts serially connected in said circuit, means for fixedly mounting one of said contacts on said casing, means for mounting the other of said contacts on said casing for movement into and out of engagement with said fixed contact and being adapted to open and close the circuit to said surface heater, said movable contact being biased toward engagement with said fixed contact, and restraining means movable from an active to an inactive position in response to movement of said movable section from said inoperative to said operative position and being operatively connected to said movable contact for moving the same to a position out of engagement with said fixed contact when said movable section is moved to said inoperative position and thereafter restricting any movement of said movable contact toward said fixed contact, said movable contact being movable in accordance with the bias thereof into engagement with said fixed contact when said movable section is moved to said operative position.

8. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said movable section projects above the top of said surface heater when in said inoperative position, said top portion of said movable section being of substantially the same level as the top of said surface heater when said movable section is in said operative position, a pair of oppositely disposed contacts serially connected in said circuit means, means for fixedly mounting one of said contacts on said movable section, means for mounting the other of said contacts on said movable section for movement into and out of engagement with said fixed contact and being adapted to open and close the circuit to said surface heater, said movable contact being biased toward engagement with said fixed contact, and restraining means movable from an active to an inactive position in response to movement of said movable section from said inoperative to said operative position and being operatively connected to said movable contact for moving the same to a position out of engagement with said fixed contact when said movable section is moved to said inoperative position and thereafter restricting any movement of said movable contact toward said fixed contact, said movable contact being movable in accordance with the bias thereof into engagement with said fixed contact when said movable section is moved to said operative position.

9. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said movable section projects above the top of said surface heater when in said inoperative position, said top portion of said movable section being at substantially the same level as the top of said surface heater when said movable section is in said operative position, a pair of oppositely disposed contacts serially connected in said circuit, means for fixedly mounting one of said contacts on said fixed section, means for mounting the other of said contacts on said fixed section for movement into and out of engagement with said fixed contact and being adapted to open and close the circuit to said surface heater, said mounting means being operative to bias said movable contact toward said fixed contact, and restraining means movable in response to movement of said movable section and operatively connected to said mounting means for moving said movable contact to a position out of engagement with said fixed contact upon movement of said movable section from said operative to said inoperative position and thereafter restricting any movement of said movable contact toward said fixed contact, said movable contact being movable in accordance with the bias thereof into engagement with said fixed contact when said movable section is moved to said operative position.

10. In a device for controlling the temperature of a cooking vessel supported on an annular surface heating element of a cooking range having a circuit connecting the heating element to a source of electrical energy, the combination comprising a casing including a fixed section and a movable section mounted on said fixed section for movement between an inoperative position and an operative position and having a top portion, said casing being adapted to be mounted within said heating element so that said top portion of said movable section projects above the top of said surface heater when in said inoperative position, said top portion of said movable section being of substantially the same level as the top of said surface heater when said movable section is in said operative position, a pair of oppositely disposed contacts, means adapted for serially connecting said contacts in the circuit to the surface heating element, means for fixedly mounting one of said contacts on said movable section, means for mounting the other of said contacts on said movable section to be biased toward said fixed contact and for movement into and out of engagement with said fixed contact to open and close the circuit to the surface heating element, restraining means movable in response to movement of said movable section and operatively connected to said mounting means for moving said movable contact to a position out of engagement with said fixed contact upon movement of said movable section from said operative to said inoperative position and thereafter restricting any movement of said movable contact toward said fixed contact, said movable contact being movable into engagement with said fixed contact when said movable section is moved to said operative position, and means operable at a predetermined temperature of the cooking vessel to be controlled for actuating said movable contact out of engagement with said fixed contact when said movable section is in said operative position including thermally responsive means mounted on said movable section and adapted for contact with the cooking vessel to be controlled and movable in response to temperature changes of said cooking vessel whereby said cooking vessel is maintained at said predetermined temperature.

11. A device as claimed in claim 10 wherein said actuating means includes an abutment means operatively connected to said thermally responsive means and engageable with said means for mounting said movable contact whereby movement of said thermally responsive means is transmitted to said movable contact through said abutment means.

12. A device as claimed in claim 11 wherein said thermally responsive means comprises a bimetallic disc element and said abutment means comprises means for adjusting said predetermined temperature at which said actuating means is operable to move said movable contact out of engagement with said fixed contact.

13. A device as claimed in claim 11 wherein said restraining means comprises a chain member connected to said movable section at one end thereof and to said fixed section at the other end thereof, said chain member being maintained in the taut position thereof when said movable section is in said inoperative position.

14. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said cover section projects above the top of said surface heater when in said inoperative position, said top portion of said movable section being of substantially the same level as the top of said surface heater when said movable section is in said opeartive position, a pair of oppositely disposed contacts serially connected in said circuit, means for fixedly mounting one of said contacts on said casing, means for mounting the other of said contacts on said casing for movement into and out of engagement with said fixed contact and being adapted to open and close the circuit to said surface heater, said movable contact being movable into and out of engagement with said fixed contact when said movable section is moved to said operative position, and restraining means for maintaining said movable contact out of engagement with said fixed contact when said cover section is in said inoperative position whereby when a cooking vessel is placed on said surface heater the circuit to said surface heater is closed, said restraining means comprising a linkage member connected to said movable section at one end thereof and to said fixed section at the other end thereof, said linkage member being maintained in an extended position when said movable section is in said inoperative position.

15. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said movable section projects above the top of said surface heater when in said inoperative position, said top portion of said movable section being of substantially the same level as the top of said surface heater when said movable section is in said operative position, a pair of oppositely disposed contacts serially connected in said circuit means for fixedly mounting one of said contacts on said movable section, means for mounting the other of said contacts on said movable section for movement into and out of engagement with said fixed contact and being adapted to open and close a circuit to said surface heater, said movable contact being movable into engagement with said fixed contact when said movable section is moved to said operative position, and restraining means for maintaining said movable contact out of engagement with said fixed contact when said movable section is in said inoperative position whereby when said cooking vessel is placed on said surface heater the circuit to said surface heater is closed, said restraining means comprising a linkage member connected at one end thereof to said means for movably mounting said movable contact and at the other end thereof to said fixed section, and said linkage member being maintained in an extended position when said movable section is in said inoperative position.

16. In a device for controlling the circuit to an annular surface heater of a cooking range, the combination comprising a casing including a fixed section and a movable section mounted on said fixed section for movement between an inoperative position and an operative position and having a top portion, said casing being adapted to be mounted within said surface heater so that said top portion of said movable section projects above the top of said surface heater when in said inoperative position, said top portion of said movable section being at substantially the same level as the top of said surface heater when said movable section is in said operative position, a pair of oppositely disposed contacts serially connected in said circuit, means for fixedly mounting one of said contacts on said fixed section for movement into and out of engagement with said fixed contact and being adapted to open and close the circuit to said surface heater, said movable contact being movable into engagement with said fixed contact when said movable contact is moved to said operative position, and restraining means for maintaining said movable contact out of engagement with said fixed contact when said movable section is in said inoperative position whereby when a cooking vessel is placed on said surface heater the circuit to the surface heater is closed, said restraining means comprising a linkage member connected at one end thereof to said means for mounting said movable contact and at the other end thereof to said movable section, said linkage member being maintained in the taut position thereof when said movable section is in said inoperative position.

References Cited in the file of this patent

UNITED STATES PATENTS

| 2,427,945 | Clark et al. | Sept. 23, 1947 |
| 2,820,129 | Long et al. | Jan. 14, 1958 |

FOREIGN PATENTS

| 760,296 | Great Britain | Oct. 31, 1956 |